Figure 2:
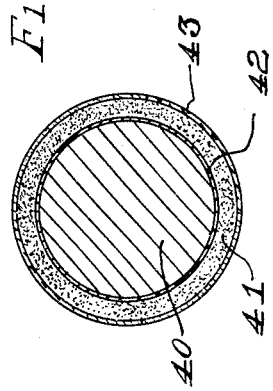

Jan. 24, 1950

S. O. DORST 2,495,630

ELECTRICALLY INSULATED CONDUCTOR
AND PROCESS FOR PRODUCING SAME
Filed May 20, 1944

INVENTOR.
STANLEY O. DORST
BY Arthur J Connolly
ATTORNEY

Patented Jan. 24, 1950

2,495,630

UNITED STATES PATENT OFFICE 2,495,630

ELECTRICALLY INSULATED CONDUCTOR AND PROCESS FOR PRODUCING SAME

Stanley O. Dorst, North Adams, Mass., assignor to Sprague Electric Company, North Adams, Mass., a corporation of Massachusetts Application May 20, 1944, Serial No. 536,448

13 Claims. (Cl. 117—70)

This invention relates to new and improved electrical conductors and more particularly refers to durable, highly flexible, abrasion-resistant, electrically-insulated wires possessing certain desirable properties which were heretofore unattainable, and processes for their production and use.

It was well known that refractory, dielectric materials, such as glass, enamels and numerous ceramics, were of particular value in the insulation of electrical conductors. Conductors coated with these materials had excellent dielectric properties. Unfortunately, however, these products had very poor mechanical characteristics. As a result, in ordinary usage the dielectric coating would be broken or weakened, causing failure of the equipment in which it was used. The brittleness and general fragility of these products generally more than offset the desirable electric characteristics thereof.

In order to overcome the foregoing disadvantages various modifications were introduced into the processes whereby refractory coated conductors were produced. For example, it was attempted to improve the mechanical strength of the products by dipping them in solutions or suspensions of highly polymerized resinous materials. Where a concentrated solution or suspension was used the resulting product was thereby given a tough surface coating which, to a certain extent, protected it from surface abrasion. Unfortunately, however, this surface coating had little or no effect on the ability of the relatively fragile ceramic undercoating to withstand flexing or bending; in fact, when products of this type were bent, even to a slight extent, the underlying brittle ceramic coating would rupture and displace itself from portions of the conductor surface, thereby rendering the product unsatisfactory for further use. Where a dilute solution or suspension of resin was used, little or none of it was left on the surface of the coating, and the amount which went into the pores of the ceramic was so small that it was ineffective, particularly after the product was baked.

When it was realized that the problem involved more than mere protection of the surface of the ceramic coating, attempts were made to improve the coating itself. These attempts generally involved the incorporation in the ceramic coating of certain agents such as the hydrated silicates of the bentonite type, or in lieu of such inorganic binders it was suggested that shellac or organic binders might be used. These coatings possess characteristics which constitute a considerable improvement over the prior art previously referred to. Despite this fact, however, their resistance to abrasion and bending was still inadequate for many purposes. These coatings were, furthermore, defective in that many types of conductors, such as fine copper wire, could not withstand the high firing temperatures which were employed to sinter the coating and permanently bond it to the conductor.

It is an object of this invention to overcome the foregoing disadvantages of the prior art and many other disadvantages which directly or indirectly result therefrom. A further object is to produce entirely new dielectric coatings for electrical conductors which possess the advantages of prior art coatings without at the same time being subject to their disadvantages. A still further object is to produce coated electrical conductors having dielectric and mechanical properties which were heretofore unobtainable. A still further object is to produce coated electrical conductors which may be used for a wide variety of purposes wherein prior art conductors were of limited value because of their poor flexibility, abrasion resistance and mechanical strength. A still further object is to produce coated electrical wires which may be operated at extremely high temperatures without failure of the insulation, or oxide formation on the conductor. Additional objects will become apparent from a consideration of the following description and claims.

These objects are attained in accordance with the present invention wherein a conductor coated with porous refractory ceramic insulation is treated with certain inorganic and/or organic chemical agents which act to protect and bond the ceramic particles to each other, and to render the insulation durable, resistant to high temperatures, flexible and abrasion-resistant. In a more restricted sense this invention is concerned with an insulated electrical conductor, the insulation of which comprises a coating of porous refractory ceramic material, the pores thereof being substantially completely filled with a stable, insulating inorganic oxide or hydroxide, such as aluminum hydroxide or related metallic oxides and hydroxides, preferably containing combined water. In a still more restricted sense, this invention is concerned with an insulated conductor comprising an electrically conducting wire to which is bonded a porous layer of refractory ceramic material, the pores thereof being substantially completely filled with a stable, insulating inorganic oxide or hydroxide, the surface of which is coated with a thin layer of an organic compound possessing surface-active properties, such as stearic acid and related hydrocarbon derivaties. The invention is also concerned with methods of enhancing the above insulation by incorporation of a relatively heat-stable, moisture-resistant resinous material on and/or in the insulation.

In one of its specific and preferred embodiments, the invention is directed to an electrically conducting wire of copper, nickel plated copper, nickel or nichrome to which has been bonded an electrophoretically deposited coating of refractory insulating material, and which is then improved by treatment with a stable, insulating inorganic oxide or hydroxide, followed by treatment with a long chain aliphatic hydrocarbon derivative.

In another of its specific embodiments, the invention is directed to a flexible conductor which has been insulated by applying thereto refractory material by means of dipping, extrusion, winding with glass yarn, asbestos fibre, mica flakes, etc. and which is then improved by the aforesaid treatment.

The invention is also concerned with processes for the production of the foregoing products, with electrical devices wherein these products may be advantageously employed, and with certain refinements wherein said processes, products and devices may be still further improved.

In accordance with one embodiment of this invention, refractory, dielectric materials, preferably in conjunction with a modifying and/or densifying agent, are electrophoretically deposited upon the surface of wire or other electrical conductors or semi-conductors. Thereafter, the coated wires are treated as hereinafter described to enhance their desirable properties and minimize their undesirable properties.

Electrical conductors and semi-conductors suitable for treatment in the foregoing manner are, for example, copper, nickel plated copper, nickel, nickel-chromium, beryllium-copper, iron-chromium, tantalum-iron-chromium and the like. In fact, any type of electrically-conducting or semi-conducting wire, plate or bar may be treated in accordance herewith. This conductor may be circular in cross-section, or may be of any other geometrical cross-section. It may vary from strands of extremely small diameter to wires, rods, bars, or plates of very large size.

In place of depositing a refractory material over the entire surface of the wire or other conductor, it may be deposited on only portions thereof, for instance, by masking the remaining portions with a coating of suitable material which may thereafter be removed, such as cellulose, masking tape, waxes, lacquers, etc. This masking material is generally non-conductive and therefore no deposit of refractory dielectric is made upon it. This partial deposition may also, of course, be accomplished by other known methods.

In many cases, for example, the use of an insulated copper wire in a motor or transformer, the temperature of operation may cause oxidation of the copper surfaces, beneath the insulating layer. This difficulty may be overcome, according to one of the embodiments of the invention, by plating the conductor with nickel or related metals prior to coating it with insulating materials. The wire or other conductor may then be insulated in accordance with the invention and may thereafter be used at high temperatures without oxide formation on the conductor surface or breakdown of the refractory insulation. Typical metals which may be used for the conductor plating, with excellent results, are nickel, cadmium, chromium and the like. Anions such as ferrocyanide and thiocyanate may also be used for this purpose. Plating of these substances on the conductor may be accomplished in the customary manner.

The wire should, of course, be cleaned before it is coated with insulating material. This may be accomplished in the usual manner.

Refractory materials which may be deposited on the foregoing conductors are extremely varied; for example, they comprise ceramic and vitreous materials generally. A few of the many materials falling within these categories are glass, porcelain enamels, aluminum oxide, vanadium oxide, manganese dioxide, nickel oxide, zinc oxide, molybdenum oxide, tungsten oxide, lead oxide, chromium oxide, bentonite, china clay, talc, magnesium silicate, aluminum silicate, silicates and insoluble borates of the materials previously referred to as metal oxides, insoluble titanates, tungstates, molybdates, ground mica and related crystalline materials, titanium dioxide in conjunction with another refractory of high negative zeta potential, etc.

These materials may be used alone or in conjunction with one another. Before use they should advisably be ground to small particle size suitable for suspension in a liquid medium in an electrophoretic cell. For this purpose ball-milling to a size of approximately 0.5 to 10.0 microns has been found to be quite satisfactory. Particle sizes less than 4.0 microns are preferred as a general rule. In order to further facilitate suspension of the foregoing and related refractory particles in a liquid medium in an electrophoretic cell, there may be added thereto assistants such as surface-active agents and/or peptizing agents. Among these may be mentioned sulfonated higher fatty acid amides; soluble salts of sulfuric acid esters of higher fatty alcohols; soluble salts of tannic acid; polyvinyl alcohols and the like. The refractory materials may be ball-milled separately or together, where more than one is employed, but it is customary to ball-mill them together.

Before use it is advisable to remove all foreign water-soluble materials from the refractory particles. These materials are generally salts and electrolytes which may produce gas in the electrophoretic cell and may cause the ceramic coating to be foamy, slimy and of inferior quality. These undesirable constituents may be removed by washing the refractory particles in distilled water or in any other suitable manner.

In order that the refractory coating will possess optimum characteristics, it is generally helpful to incorporate therewith in the electrophoretic cell, certain modifying agents and/or densifying agents. These agents, as hereinafter described, produce ceramic coatings which are outstandingly superior to coatings produced without them.

Modifying agents, upon deposition with the refractory material, and subsequent treatment, produce a coating pronouncedly improved by their presence. Increased flexibility and toughness, and resistance to abrasion and to mechanical failure are the major benefits from their presence. Treatment subsequent to the electrophoretic deposition of the coating is ordinarily necessary for full derivation of these benefits. This treatment may be of a chemical and/or physical nature. An example of a modifying agent is sodium silicate, and the benefit from its presence may be obtained by passing the coating through a solution of lead acetate, whereby the sodium ions pass into solution and the lead ions combine with the silicate ions to form an insoluble lead silicate which remains in the coating. The coating may then be heated to temperatures in the range of about 800° C. to about 1000° C., whereby the insoluble lead silicate is probably combined with the refractory material of the coating. A complex and highly stable refractory coating may thus be obtained. Sodium silicate is also of great value when it is subjected to heat treatment alone.

Ground mica is another example of a modifying agent. Superior coatings have been obtained using ground mica as a modifying agent and subsequently sintering the coated wire. Other modifying agents which may be used are zinc oxide, hydrated silicates, etc. They are subjected, following deposition, to the treatment hereinafter described in order to derive the full benefit therefrom: chemical treatment and/or sintering for the zinc oxide, sintering for the hydrated silicates, sintering for the mica and related crystalline materials, etc.

Densifying agents aid in producing a dense deposit of the refractory mixture on the conductor during the eletrophoretic process. These agents are particularly helpful in that they produce the maximum zeta potential on the refractory particles in suspension thereby greatly facilitating their deposition and improving their subsequent performance. The dense deposits produced with these agents result in a more uniform coating which will resist mechanical damage during plating and before subsequent treating. Further, they prevent fluffy and exceedingly porous coatings from being formed, thereby producing the maximum dielectric value per unit thickness. For these purposes, densifying agents are of extreme value, and it should be understood that their use herein is preferred. These agents are usually electrolytes and generally have monovalent cations and polyvalent anions as, for example, sodium silicate, potassium silicate, and lithium silicate, sodium-, potassium-, lithium phosphates, sodium-, potassium-, and lithium ferrocyanides. These anions may also be electrolytically deposited on the conductor before electrophoretic deposition of the ceramic material. In place of sodium, potassium, and lithium ions, other ions, preferably those at the beginning of the Hofmeister series, may be used; or complex monovalent ions, such as benzyl trimethyl ammonium and dodecyl pyridinium, etc. Such compounds produce a high negative zeta potential on the refractory particles.

In cases where a high positive zeta potential is desired, as for example, when using barium titantes and other metal titanates as refractory materials, thorium salts, such as thorium phosphate, can be employed to good advantage.

The densifying agent is selected and added to the refractory mixture in fairly small concentrations. One method used to determine the correct amount to be added is to measure the resistivity of the suspension. Since the densifying agents are generally electrolytes, the resistivity is in direct relationship to their concentration. For use herein it is ordinarily advisable to prepare suspensions possessing a resistance between about 50 and about 10,000 ohms per cubic centimeter. In the case of sodium silicate the preferred resistance range of the suspension is between about 100 and about 1500 ohms per cubic centimeter.

In some cases the agents have both a densifying and modifying function. An example of this type is sodium silicate. Sodium silicate may be used for either or both purposes. Mica and related crystalline materials act as both refractory materials and modifying agents.

It is to be understood that for optimum results over widely varying conditions, with different refractory materials and combinations thereof, densifying and modifying agents should be employed. It is further to be understood that a plurality of modifying agents or a plurality of densifying agents may be used in the electrophoretic cell in order to provide refractory coatings with unique characteristics.

As in the case of the refractory materials, the modifying and densifying agents should be in such form that they will be codeposited from the electrophoretic solution with the refractory material. In the case of inorganic insoluble agents they should be finely ground, for instance, to a fineness of about 600 mesh. In the case of water soluble agents, as, for example, most of the densifying agents, they should be dissolved in the electrophoretic liquid.

As a general rule the refractory material, modifying agent and densifying agent will be present in an aqueous medium in the electrophoretic cell. The liquid medium should preferably be distilled water, although other poorly conducting media may be used for this purpose.

For purposes of obtaining a homogeneous suspension, it is generally advisable to mix the ingredients well prior to use in the electrophoretic cell. The preferred method is to mix the ingredients with half of the total liquid medium in a recycling attrition mill, then add the other half of the liquid medium and continue mixing in the attrition mill. However, other suitable means therefor may be used.

In carrying out the invention, the amount of refractory material and the individual constituents thereof as well as the amount of modifying and densifying agents and the individual constituents thereof may be varied widely. The refractory material will, of course, ordinarily preponderate. For example, a suspension of 45% by weight of china clay, 45% by weight of talc, 9% by weight of ground mica and 1% by weight of sodium silicate might be used. As a general rule, it may be stated that the amount of refractory material constitutes from about 99% to about 40% by weight of the total, the amount of modifying agent constitutes from about 1% to about 50% by weight of the total and the amount of densifying agent constitutes about 0.1% to about 10% by weight of the total.

Upon electrophoretically depositing upon the conductor the mixture of refractory material and modifying and densifying agents, it is advisable to treat the resulting coated conductor in order to permanently attach the coating particles to the base and to each other. The particular type of treatment employed for this purpose will depend to a great extent upon the coating composition used, the characteristics of the base upon which it is deposited, and the use for which the final product is intended. As a general rule, heat treatment alone produces excellent results.

In the case of a wire which may be subjected to extremely high temperatures without injury, addition to the refractory material of zinc oxide and sodium silicate produces extremely good results. The ceramic coating containing the aforesaid materials may be permanently attached to the base by sintering at elevated temperatures, for example, temperatures on the order of about 1000° C., although lower temperatures may be used with good results. The temperature of this sintering operation should be so selected that the wire base is not injured.

While electrophoretic deposition of the refractory material has been disclosed as a preferred embodiment of the invention, other methods of deposition may be used in conjunction with the treatments described hereinafter to produce outstanding flexible, abrasion-resistant insulated conductors. Among these are extrusion of ceramic pastes upon the wire, followed by subsequent removal of water and other vaporizable constituents of the paste by heating, etc.; dipping of the wire in a suspension of the refractory ceramic material, following this by drying and, in some cases, sintering. Alternately, the conductor may be provided with a wound glass fibre or asbestos layer which acts as a matrix for the ceramic particles, or which takes the place of the ceramic particles. Another method which may be employed involves suspending the refractory ceramic particles in a lacquer which is placed on the conductor. Subsequently, the lacquer may be burned off, leaving a porous deposit of refractory ceramic material. An additional method, which is particularly suitable on aluminum wire, involves oxidation of the conductor surface under conditions favoring the formation of a relatively porous, non-conducting oxide film on the conductor surface.

Following the electrophoretic or other deposition of refractory ceramic material, and treatment thereof to sinter the particles together and bond them to the base, the conductor is treated in the manner hereinafter described to ultimately produce flexible, abrasion-resistant, tough, heat-resistant insulation thereon.

Generally speaking, this treatment occupies two steps, although either one of these steps may be applied by itself. The first step involves forming in the pores of the ceramic material a heat-stable inorganic gel which is advisably an insulating metallic oxide or hydroxide, such as the aluminum hydroxide produced by thermal decomposition of aluminum nitrate. The second step is the application to the aforesaid coating of a thin layer of a surface-active material, advisably a long chain aliphatic hydrocarbon derivative such as stearic acid.

The first-mentioned step may be undertaken by any one of several means. One highly successful process involves the impregnation of the pores with a decomposable insulating metal salt, followed by heating to temperatures sufficient to cause decomposition thereof with formation of a stable metal hydroxide, generally in the form of a gel which should advisably contain some combined water of hydration. A typical example of such a process is the impregnation of the ceramic pores with a fairly concentrated water solution of aluminum nitrate and subsequent heating to temperatures preferably between about 300° C. and about 500° C. to form by decomposition, a stable aluminum hydroxide gel, which substantially completely fills said pores. While outstanding results have been obtained using aluminum nitrate, it is contemplated that other metal salts may be used in place thereof or in admixture therewith, such as the nitrates, oxychlorides, silicates, fluosilicates, tungstates, chlorates, aluminates, phosphates, oxalates, and other organic and inorganic salts of aluminum, lead, zirconium, vanadium, calcium, chromium, beryllium, silver, selenium, cerium, thallium, zinc, silicon, strontium, etc.

The method of application of these salts may be varied. When the salts contain a sufficient amount of water in their hydrate form to permit decomposition to a hydroxide or other stable gelatinous state, a water solution need not be used. Dipping of the conductor in the salt solution may be employed, or, if the salt is substantially insoluble in the water or other medium, it may be electrophoretically deposited in the pores from a suspension of finely ground particles.

Decomposition of the salt may be accomplished by exposure in an oven, or, in the case of resistance wire, such as nichrome, by passage of electrical current through the conductor, if so desired.

An alternative method of producing the gel in the ceramic pores is to employ a chemical reaction therein. For example, the conductor may be passed through a water solution of sodium silicate, to thoroughly impregnate the pores therewith; then it may be passed through an acid solution, such as hydrochloric acid, acetic acid and, in general, weak organic acids, to form a silica gel in the pores. This expedient may be applied with other soluble silicates, tungstates, aluminates, etc.

At this point the conductor is coated with a refractory ceramic matrix, the pores thereof being substantially completely filled with an insulating, heat-stable, cushioning gel or metal oxide hydrate.

The second step in the preferred treating process involves the treatment of this coating with a surface-active agent which would customarily contain an aliphatic hydrocarbon group of at least eight carbon atoms.

Preferably this agent is stearic acid or a related fatty acid derivative. However, it is contemplated that surface-active agents generally, or mixtures thereof, may be used for this purpose, such as the following acids and their derivatives: isovaleric acid; pivalic acid; valeric acid; alpha, alpha dimethyl butyric acid; alpha, beta dimethyl butyric acid; alpha ethyl butyric acid; caproic acid; isocaproic acid; 2 methyl pentanoic acid; 3 methyl pentanoic acid; diethyl methyl acetic acid; 2 methyl hexanoic acid; enanthic acid; 2 ethyl pentanoic acid; 3 ethyl pentanoic acid; butyl ethyl acetic acid; caprylic acid; pelargonic acid; capric acid; hendecanoic acid; lauric acid; tridecanoic acid; myristic acid; palmitic acid; margaric acid; alpha ocye capric acid; stearic acid; nonadecanoic acid; behenic acid; arachidic acid; lignoceric acid; cerotic acid; mellisic acid; and higher straight chain or related acids. Among the unsaturated acids are angelic acid; 4-pentenoic acid; tiglic acid; alpha ethyl crotonic acid; 2 hexenoic acid; 4 methyl-2-pentenoic acid; 5-methyl-2-hexenoic acid; di-campholic acid; 9-hendecenoic acid; hypogeic acid; elaidic acid; oleic acid; brassidic acid; euricic acid; recinoleic acid; and higher derivatives. Among the dicarboxylic acids are glutaric acid; pyrotartaric acid; ethyl malonic acid; adipic acid; propyl malonic acid; ethyl succinic acid; isobutyl malonic acid; pimelic acid; tetramethyl succinic acid; azelaic acid; heptyl malonic acid; sebacic acid, etc. Also suitable are the alcohols, aldehydes, esters, amides, etc. corresponding to the above acids. It is possible to use compounds similar to those disclosed above in which heterocyclic, aromatic and other ring structures are present. Sulfated, sulfonated, halogenated, and other derivatives are likewise contemplated for use herein. In some cases, metal salts of the acids may be employed. It is also contemplated that natural waxes and oils containing one or more of the compounds listed above may be employed, although the results would generally be inferior to the purer forms of surface-active agents.

The acids or other chemical agents used in treating the insulation may be applied from solution in an appropriate solvent which may be subsequently evaporated or otherwise removed. Alternately the conductor may be passed through suspensions or emulsions of these compounds or mixtures thereof, or they may be electrophoretically applied from an emulsion.

Following application of the surface-active agent to the insulation and physical treatment to remove the solvent or suspension medium, the insulated conductor is ready for use. It possesses a surprisingly abrasion-resistant, flexible, tough, heat-stable insulating coating thereon.

While the reason for the remarkable, superior abrasion resistance and toughness produced is not fully understood, it may be that thin films of a heavy metal soap form between and about the ceramic particles and between the gel and the surface-active agent. These thin films may act as lubricants to permit the flexing and rough handling of the insulation without rupture. Possibly the gel or metal oxide hydrate absorbs the chemical agent to form a resinous and resilient pore-filling medium. Whatever the mechanism, the products are surprisingly flexible and durable.

It has been observed that it is preferable to apply a sufficient amount of the surface-active agent to the coating to provide an excess thereof in the form of a very thin superficial coating on the outer surface of the insulation.

While the conductor possesses, as aforesaid, unusual stability to heat, flexing, etc. without insulation decomposition, rupture, etc. it is often desirable to also apply a superficial coating of a moisture-resistant, heat-stable resinous material which will improve the overall moisture resistance of the insulation, without at the same time impairing the other desirable properties thereof. This resinous material may be applied in conjunction with the surface-active agent or subsequently, as desired. In fact, it may be applied to the entire surface of the electrical device, in which the coated wire is incorporated as a coil or otherwise. When so applied it dispenses with the necessity of a glass, metal or other moistureproof housing. It is often applied in a monomeric or low polymeric state and subsequently it is more completely polymerized, by heat, actinic light, oxygen, etc. Among the resinous materials which may be employed with good effect are the monomers and/or polymers of polymerizable silicon derivatives, such as the hydrolysis products of alkyl-, aralkyl-, and/or aryl-chlor-silanes; polymerizable boron derivatives; tetrafluoro ethylene; heat-stable vinyl derivatives, generally; and other resinous inorganic or organic materials possessing in polymer form heat- and moisture-resistance.

A large number of resins contemplated for this purpose are referred to in the copending United States Letters Patent Nos. 2,406,319 of Lester A. Brooks and Mathew Nazzewski and 2,473,985 of Lester A. Brooks. These resins may be used either alone or in conjunction with one another. A plurality of resins frequently permits the desirable characteristics of each to be improved. Likewise these resinous materials may have incorporated therewith one or more plasticizers to improve their physical characteristics for any desired purpose.

Where the insulated wire is to be used in an electrical device operating at high temperatures it is, of course, advisable to select a resin which does not decompose at these temperatures. The resins known as "silicones" are particularly suitable for this purpose.

Figure 1:
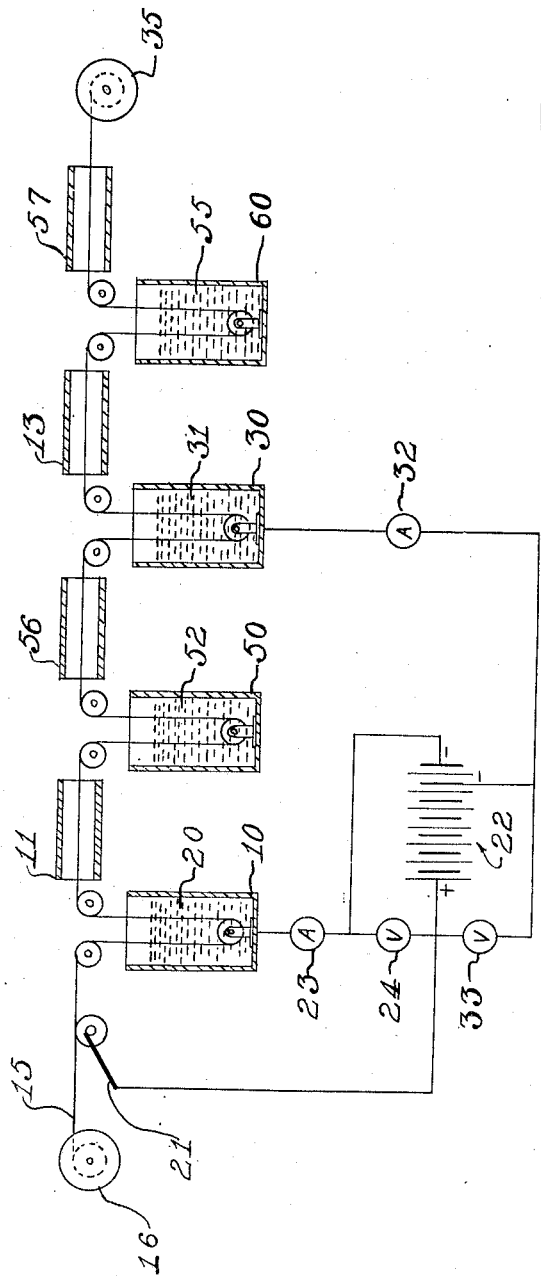

The invention will be further and more specifically described with reference to the appended drawings, in which Figure 1 illustrates one form of apparatus suitable for producing electrically insulated conductors in accordance with the invention.

Figure 2 is a cross-sectional view on an enlarged scale showing a wire conductor provided with an insulating coating in accordance with the invention.

The apparatus illustrated in Figure 1 comprises a coating cell 10 within which a wire element is initially provided with a refractory insulating coating, an oven 11 for processing the refractory coating, a cell 50 for applying the metal salt, an oven 56 for processing the impregnated coating, a coating cell 30 for applying the surface-active agent and also, in some cases, a resinous material on the coating applied in cells 10 and 50, an oven 13 for processing the resulting coating, a cell 60 for providing a surface layer of a surface-active agent, and an oven 57 for processing the final product.

Referring more specifically to Figure 1, wire 15 is unwound from a spool 16 and passes around a mandrel into the coating cell 10. Within the cell 10 the wire is initially electrophoretically coated from a suspension 20 of a refractory insulating material.

Preferably the container 10 forms one electrode of the coating cell and for this purpose it is made of an electrically conducting material such as copper. The wire 15 to be coated forms the other electrode of the cell and electrical connection thereto is provided by a brush 21.

The current for depositing the coating is supplied by a suitable source of direct current shown as a battery 22, the negative pole of which is connected to the container 10 through an ammeter 23 and the positive pole of which is connected to the contact brush 21. A voltmeter 24 for indicating the coating voltage is connected in shunt across the brush 21 and the container 10.

The current used for the electrophoretic coating in the cell 10 depends for a given coating material on the time of deposition, the length of immersion and speed of the wire in the coating cell and the desired thickness of the coating. For example, when electrophoretically coating copper wire approximately .025″ in diameter in a coating solution comprising an aqueous suspension of 185 grams per liter of refractory particles of talc and china clay having an average size of 2 microns, which solution also contains 2.7% by weight of zinc oxide, and 0.5% by weight of a 40% solution of sodium silicate, and when the wire travels at a speed of 24 feet per minute with 2 feet of the wire immersed in the coating solution, a coating .001″ thick is produced by a current of 15 milliamperes.

The coated wire is then subjected to heat treatment within the oven 11 in order to remove liquids and bond the coating to the wire. The temperature of the heat treatment in the oven 11 is largely determined by the wire coated and the coating material applied in the cell 10. When processing a coating of the above described composition a temperature of about 300° C. to about 1000° C. may be used to sinter it.

On emerging from the oven 11 the coated wire 15, having been cooled by air, passes into a bath 50 within which the pores of the coating are filled with a solution 52 of a decomposable metal salt such as aluminum nitrate (about 60 grams to 100 cc. of distilled water).

The wire then passes through oven 56 which serves to decompose the aluminum nitrate, filling the pores of the refractory coating with a cushioning gel or hydrate which exhibits an unexpected tendency to adhere to the conductor surface and refractory particles. The oven 56 may be held at about 400° C. to accomplish the specific decomposition required. The resulting refractory coating is substantially non-porous.

The wire now passes into coating cell 30 which contains a solution of a surface-active agent and, in some cases, a resinous material. If a resinous material, such as "silicone," is to be codeposited on the refractory coating, a mutual solvent in which the surface-active agent and resin are both soluble should preferably be employed. Xylene may be used when stearic acid and a "silicone" resin are employed.

This material may be applied to the coated wire merely by dipping it in the xylene solution. It may also be applied by electrophoretic deposition, in which case the resin and fatty acid would be present in cell 30 in the form of an emulsion, and current would be supplied thereto by battery 22 through ammeter 32, the voltage thereof being indicated on voltmeter 33.

The actual amount of the stearic acid or other surface-active agent present in the cell 30 is often quite small, since large amounts thereof do not appear to be necessary for optimum results. When the agent is applied in conjunction with a resinous material, it is preferable to maintain it within the range from about 1½% to about 10% by weight of the solution, although these percentages are not critical.

If no resinous material is employed, the percentage of surface-active agent in solution may be increased to between about 5% and about 25%. Here again, the range is not critical.

The percentage of the resin in the solution or emulsion is generally between about 10% and about 30%, and, in the case of "silicone," it is preferably about 16%. The optimum amount depends, of course, upon the nature of the resinous material, such as its viscosity, etc. It is also preferable to employ resinous materials, which are liquids per se until final curing. This permits any solvent and vaporizable constituents to be completely removed therefrom without being entrapped, thereby leaving bubbles and pockets in the resinous layer. The resin selected should generally be stable at the temperature at which the coated wire is to be operated. If desired, however, after the wire is coiled in its ultimate form the resin may be burned off, or otherwise removed.

It is to be understood that mixtures of two or more surface-active agents and/or two or more resinous materials may be employed, in place of a single agent or resin. This is particularly applicable with "silicone" resins, as outstanding moisture-resistant and heat-stable coatings may be produced by co-polymerizing various silicon derivatives, i. e., hydrolysis products of the alkyl-, aralkyl- and/or aryl-chlor-silanes, wherein the products containing different alkyl groups (methyl, ethyl, phenyl, etc.) are co-polymerized.

The treated wire then passes into oven 13 where the solvent is removed and the resin, if employed, is polymerized or further polymerized. For this purpose, it is advisable to have the oven temperature somewhat graduated, the temperature at the entering end being only high enough to remove the solvent, then increasing at the latter end to effect the resin polymerization. It may be that the temperature of the oven induces chemical and/or physical action between the surface-active agent and the gel or other inorganic insulating impregnant within the ceramic pores. The temperature of the oven is generally about 600° C., to effect a proper polymerization of the resin, although other temperatures may be used with satisfactory results.

The wire then passes into coating cell 60 which contains a solution 55 of stearic acid or other surface-active agent in a solvent. This step generally is employed only when a resinous material is introduced in the coating in the previous step in the process. Since the resin may be omitted, this step may also be omitted. A particularly suitable medium is 20 parts of stearic acid dissolved in 130 parts of xylene. The solution appears to produce a substantially mono-molecular layer on the surface only. The concentration of the agent in the solution is preferably between about 3% and about 20%.

The solvent may be removed by passing the wire through oven 57, leaving a thin, abrasion-resistant layer of stearic acid on the insulation surface. This step is also advantageous in that any tackiness of the underlying insulation is eliminated by this final thin superficial coating. The wire is then wound on storage spool 35.

Suitable driving means (not shown) rotate the spools 16 and 35 and move the wire through the coating apparatus.

Figure 2 is an enlarged cross-sectional view of a coated conductor made in accordance with the invention. This conductor comprises a copper wire 40 with a thin plating 42 of a different metal, such as nickel, the latter being selected for its high resistance to surface oxidation at elevated temperatures, and its adaptability to the coating operation. In the case of copper wire, as described in connection with Figure 1, the plating would preferably be nickel and placed thereon by well known electroplating methods.

41 is the refractory ceramic coating in which is uniformly distributed a hydroxide or oxide of an insulating metal, preferably in the form of a gel formed by the decomposition of a metal salt such as aluminum nitrate. (On the surface of this coating may be a layer of stearic acid and a resin such as a polymerized silicone.) 43 is a thin superficial coating of stearic acid, or other surface-active agent.

The durable, highly flexible, electrically-insulated wires or other conductors or semi-conductors produced in accordance with this invention may be used for a multitude of purposes for which their unusual characteristics render them particularly adapted. They are particularly useful in the manufacture of electrical transformers, motors, generators, transmission lines, resistors, vibrators, choke coils and the like, particularly where they must operate at high temperatures for long periods, for example, about 200° C. or higher.

In general, they may be used wherever insulated wires or other insulated conductors or semi-conductors have heretofore been used or are capable of use.

An outstanding resistor, solenoid, or other wire wound element may be produced by winding the wire insulated as heretofore described about a core of steatite or other material, affixing terminals thereto and subsequently dipping the whole unit in a solution of a heat-resistant, moisture-resistant, resinous material, which may then be polymerized in situ on the assembly. In the case of a resistance element, the wire may be wound in any prescribed manner about a ceramic core, then dipped in a solution of "silicone," and heated to remove the solvent and polymerize the "silicone." The dipping and heating process may be repeated several times to obtain a thick coating on the assembly. This coating dispenses with the necessity of a protective housing. A resistor thus produced may be subjected to numerous immersions in hot and cold salt water without being impaired in the least. It has the further advantage of being capable of operation over extended periods of time at 200° C. or higher without failure of the insulation or any components thereof. By this expedient, need for expensive and delicate resistors, hermetically sealed by glass tubes and metal caps, is entirely overcome, since a resistor produced as described above will fulfill all the qualifications required thereof, for precision operation under extreme temperature and other conditions.

In the non-electrical field the insulated wires described heretofore may be used in the manufacture of household screens, metal fences, and related articles wherein their durable coatings permit them to withstand severe weathering and other conditions of use without deterioration. They may also be used in the manufacture of glass substitutes wherein they are first formed into a screen, either before or after the wires are coated as aforesaid, and thereafter the interstices of the screen are filled with a plastic composition, by dipping in a solution of cellulose acetate, cellulose nitrate, polymerized methyl methacrylate, polymerized vinyl derivatives, etc., and thereafter drying the resulting coated product.

Another use for which they are suitable is in the manufacture of wire gauze for chemical use, wherein the ceramic coating forms a heat resisting and non-charring coating for the wire generally used. For this purpose they may, if desired, be coated with layers of any desired catalyst.

Wherever electrical conductors or semi-conductors are exposed to weathering or conditions of use which require one or more of the characteristics of durability, abrasion resistance, flexibility and electrical insulation for protection of the base material, or the proper performance of its intended functions, it is contemplated that the products hereof may be used.

The foregoing invention is also useful in obtaining thin flexible sheets of insulating material. The electrode to be coated in this case may be an endless foil, the surface of which may be pretreated to facilitate removal of the deposited and treated coating. The so-obtained sheets of insulating material may thereafter be used for any of the numerous purposes for which self-sustaining sheets of insulating material have previously been used or are capable of use.

In addition to the use of glass fibers as a matrix for or substitute for the ceramic material, as mentioned heretofore, these fibers or yarns may be wound on the completed products to increase their strength and durability. For instance, glass fibers may be wound around the ceramic coated wire, either before or after the ceramic coating has received the treatments described previously. Thereafter a coating of resinous material, such as "silicone," may be applied to the wound product. Of course, it is understood that a coating of resinous material, such as "silicone," may be applied to the ceramic coating before winding with the glass fibers. Furthermore, multiple layers of glass fibers may be used, either adjacent to one another or interspersed by resins, ceramic materials, etc. The employment of glass yarn as aforesaid produces an extremely durable product which will withstand most severe handling.

This application is filed as a continuation-in-part of United States patent application Serial No. 496,978, filed by Preston Robinson and Stanley O. Dorst on August 2, 1943 (now U. S. Patent No. 2,421,652).

As many apparently widely different embodiments of this invention may be made without departing from the spirit and scope hereof, it is to be understood that the invention is not limited to the specific embodiments hereof except as defined in the appended claims.

I claim:

1. A process for producing a durable, highly flexible, abrasion-resistant, electrically insulated conductor which comprises impregnating the pores of a porous refractory coated conductor with an aqueous solution of aluminum nitrate, heating the resulting product to decompose the aluminum nitrate and produce therefrom a hydrated aluminum oxide then applying to the surface thereof a thin coating of stearic acid.

2. A durable, highly flexible, abrasion-resistant, electrically insulated conductor comprising a fine, electrically conducting wire coated with a refractory insulating coating of heat-treated china clay, talc, and zinc oxide, said refractory coating having a porous structure, the pores of which are impregnated with a hydrated aluminum oxide gel, said coating being covered with polymerized silicone and stearic acid, and upon the surface of which is a thin layer of stearic acid.

3. A process for producing a durable, highly flexible, abrasion-resistant, electrically insulated conductor which comprises treating a conductor, the surface of which is covered by a porous refractory material, with a metal salt which decomposes on heating to form a hydrated metal oxide, then heating the so-treated product to decompose said metal salt and form the metal oxide hydrate which seals the pores in the refractory coating.

4. A process for producing a durable, highly flexible, abrasion-resistant, electrically insulated conductor which comprises treating a conductor, the surface of which is covered by and permanently bonded to a porous refractory material, with an aluminum salt which decomposes on heating to form a hydrated aluminum oxide, then heating the so-treated product to decompose said aluminum salt and form a hydrate of aluminum oxide which seals the pores in the refractory coating.

5. A process for producing a durable, highly flexible, abrasion-resistant, electrically insulated conductor which comprises treating a conductor, the surface of which is covered by and permanently bonded to a porous refractory material, with an aluminum salt which decomposes on heating to form a hydrated aluminum oxide, then heating the so-treated product to decompose said aluminum salt and form a hydrate of aluminum oxide which seals the pores in the refractory coating, and thereafter applying to said coated conductor a thin layer of a fatty acid containing at least eight carbon atoms.

6. A durable, highly flexible, abrasion-resistant, electrically insulated conductor which comprises a conductor, the surface of which is covered by a porous refractory material, substantially all the pores of said refractory material being sealed with a metal oxide hydrate formed in situ.

7. A durable, highly flexible, abrasion-resistant, electrically insulated conductor which comprises a conductor, the surface of which is covered by and permanently attached to a porous refractory material, substantially all the pores of said refractory material being sealed with a hydrated aluminum oxide formed in situ.

8. A durable, highly flexible, abrasion-resistant, electrically insulated conductor which comprises a conductor, the surface of which is covered by and permanently attached to a porous refractory material, substantially all the pores of said refractory material being sealed with a hydrated aluminum oxide formed in situ, the surface of said coating being covered with a thin layer of a fatty acid containing at least eight carbon atoms.

9. A process as claimed in claim 4, wherein the porous refractory coating upon the conductor comprises a uniform mixture of refractory particles bonded by the anodic electrolytic deposition product of a water-soluble silicate.

10. A process as claimed in claim 5, wherein the porous refractory coating upon the conductor comprises a uniform mixture of refractory particles bonded by the anodic electrolytic deposition product of sodium silicate.

11. A process for producing a durable, highly flexible, abrasion-resistant, electrically insulated conductor, which comprises impregnating the pores of a porous refractory coated conductor with a hydrated aluminum oxide, formed in situ by the thermal decomposition of an aqueous aluminum salt solution, immersing said product in a solution of silicone and stearic acid, heating to polymerize the silicone, and applying to the surface thereof a thin coating of stearic acid.

12. A process as claimed in claim 3, comprising the further step of thereafter applying to the so insulated conductor a protective coating of a moisture-resistant, heat-stable, polymeric, resinous material.

13. An insulated conductor as claimed in claim 6, said conductor being provided with a protective coating of a moisture-resistant, heat-stable, polymeric, resinous material.

STANLEY O. DORST.

REFERENCES CITED

The following references are of record in the file of this patent:

UNITED STATES PATENTS

| Number | Name | Date |
| --- | --- | --- |
| 1,085,227 | Seaman | Jan. 27, 1914 |
| 1,806,589 | Espig et al. | May 26, 1931 |
| 1,829,877 | Schroeder | Nov. 3, 1931 |
| 1,896,043 | Ruben | Jan. 31, 1933 |
| 1,907,984 | Kraner | May 9, 1933 |
| 1,993,388 | Stockbridge et al. | Mar. 5, 1935 |
| 2,107,318 | Work | Feb. 8, 1938 |
| 2,179,453 | Palmateer | Nov. 7, 1939 |
| 2,215,167 | Sumner et al. | Sept. 17, 1940 |
| 2,258,218 | Rochow | Oct. 7, 1941 |
| 2,258,219 | Rochow | Oct. 7, 1941 |
| 2,307,018 | Cardell | Jan. 5, 1943 |
| 2,327,462 | Ruben | Aug. 24, 1943 |

OTHER REFERENCES

Book, "Chemistry of the Silicones," by Rochow, published in 1945 by John Wiley and Sons, page 70.